Patented Dec. 19, 1944

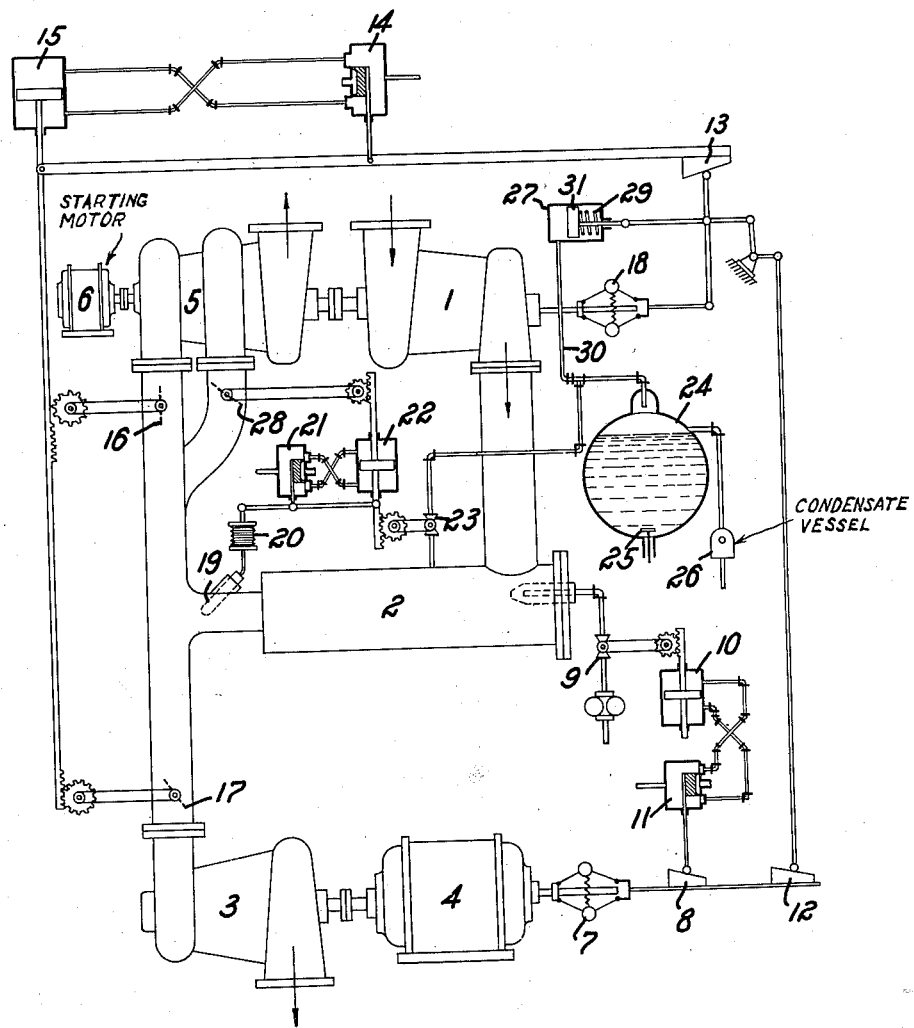

2,365,616

UNITED STATES PATENT OFFICE 2,365,616

REGULATING APPARATUS FOR GAS TURBINE PLANTS

Otto Zweifel, Baden, Switzerland, assignor to Aktiengesellschaft Brown, Boveri & Cie., Baden, Switzerland, a joint-stock company Application November 26, 1941, Serial No. 420,602
In Switzerland November 28, 1940

4 Claims. (Cl. 60—42)

With gas turbines having constant pressure combustion, out of consideration for the efficiency, the temperature of the driving gas at all loads is maintained as high as the blading will allow for a safe operation of the turbine. If the driving gas temperature is determined by adding cooling air, each load on the turbine requires a definite amount of air and this corresponds to a definite compressor speed when a centrifugal type compressor is used and if the plant is to operate with a high efficiency.

For this reason the gas turbine driving its own compressor is allowed to run whenever possible with variable speed or alternatively it is an advantage to construct the plant with several shafts whereby the effective power turbine runs at a constant speed and the gas turbine or turbines driving the compressor having variable speeds. This, however, complicates the regulation because it is impossible without adopting special measures to accelerate the turbine and its compressor sufficiently quickly to the speed required to enable it to deliver the amount of air corresponding to the new load when large and sudden increases in load occur. The amount of fuel required for the increase in power could immediately be supplied and completely burnt because there would be sufficient oxygen available in the cooling air but this course cannot be adopted because the temperatures attained would be far too high. Furthermore this increase in temperature alone would not suffice to produce the necessary power for the acceleration unless at the same time the quantity of driving gas were also increased. In addition to the cooling medium it is therefore also necessary to provide for an additional driving medium which is immediately available.

It is now proposed for the regulation of gas turbine plants with one or more shafts of which at least one changes its speed with the load, to mix water or steam with the driving gases only during the regulation process in order to accelerate this latter.

It has often been proposed to add water to the driving gas of a gas turbine in order to keep its temperature low. Furthermore it is also known to use steam for cooling purposes or to increase the output of gas turbines by the addition of steam. This addition of steam occurs, however, continuously during normal operation and results in a reduction of the efficiency of the plant unless the steam consists of waste steam which could not otherwise be profitably employed.

In the present case water is injected or steam added only during the short time which is necessary to produce the increase in speed corresponding to the increased load. This period is so short that any temporary reduction in efficiency is of no importance. If waste steam is used for the purpose there will be no decrease in efficiency at all.

In connection with gas turbines driving charging blowers for internal combustion engines it has also been proposed to accelerate the regulation by means of compressed air which is stored in bottles and either together with the driving gases or separately is supplied through special nozzles to the turbine wheel. This method can be considered for the comparatively small powers dealt with by charging plants but is much too wasteful, complicated and expensive for gas turbine installations where the gas turbine is the prime mover.

One embodiment for applying the method according to the invention is illustrated diagrammatically in the accompanying drawing where a plant with two gas turbines and a common combustion chamber is shown, steam being used to accelerate the process of regulation.

Atmospheric air is sucked in by compressor 1, compressed and passed on to combustion chamber 2 where the fuel is burnt. After leaving the combustion chamber the driving gas passes on the one hand to the effective power turbine 3 which drives the electric current generator 4 at constant speed, and on the other hand to the second turbine 5 which supplies its power to compressor 1 and is driven at variable speed. The compressor set is provided with a starting motor 6 for putting the plant into operation. Speed governor 7 by means of a cam 8 determines the position of fuel valve 9 which is actuated by a power piston 10 and a control piston 11. If, for instance, the speed of the current generator 4 drops due to an increase in load then fuel valve 9 is opened further so that the temperature of the driving gases increases and turbines 3 and 5 can produce more power. A second cam 12 influences the speed regulation of the compressor set by means of a third cam 13, a control piston 14 and a power piston 15 which regulate the distribution of the power given by the driving gases to the two turbines. In the constructional example illustrated two throttling elements 16 and 17 are provided which alternately throttle the gases in front of one or the other of the turbines. When a load is applied for instance, cam 13 is raised by the rods, the position of speed governor 18 remaining unchanged, so that first of all throttle valve 16 is fully opened (if it is not already fully open) and throttle valve 17 commences to close. By this means the output of turbine 5 is increased until the speed of compressor 1 has reached its predetermined value. When this is the case, speed governor 18 by means of cam 13 rearranges the power distribution between the two turbines again so that the speed of the compressor does not rise or drop further.

When there is a sudden considerable decrease in the load the regulation functions quite correctly in the following manner. First of all the temperature of the driving gas immediately drops sharply due to a reduction in fuel, whereupon the quantity of air is reduced due to the gradual decrease in the compressor speed with the result that the temperature of the gas rises again. Upon the occurrence of a sudden large load the temperature of the driving gas would temporarily rise to an inadmissible value. At this moment, however, in accordance with the invention a regulating element comes into operation which adds the fluid medium (water or steam) for increasing the volume of the driving gases. In the arrangement shown in the drawing a temperature responsive element 19 of the expanding fluid type and an associated bellows chamber 20 operate, when the temperature reaches its highest allowable value, to move the control piston 21 and thereby bring power piston 22 into operation. Valve 23 which is controlled by power piston 22 serves for the admission of the fluid medium into the driving gas systems from an appropriate supply vessel 24.

The fluid medium may be introduced into the combustion gases at a desired point in the system and, as shown, the valve 23 controls the admission of steam directly into the combustion chamber 2. The volume of the combustion gases is increased when the fluid medium is introduced during a regulating operation, and the pressure therefore increases within the combustion chamber and gas passages since the flow of combustion gases through the turbines does not increase in proportion to the increased volume of combustion gases. This increased pressure at the outlet of the compressor 1 would decrease the compressor output volume and result in "pumping" or unstable compressor operation. This condition is avoided by providing additional outlets for the combustion gases during the regulating process to increase, in effect, the cross-sectional area of the outlet gas passage or passages from the compressor.

In the constructional example under consideration this increase in cross-sectional area is achieved by introducing the driving medium into a later stage of the driving turbine of the compressor. By-pass valve 28 is closed during normal service. When power piston 22 moves to open the injection valve 23 to deliver the fluid medium to the driving gases; it simultaneously opens the valve 28.

The drawing illustrates an embodiment of the invention in which steam from a source, not shown, is used to accelerate the regulating operation. In order to have a sufficient quantity of steam immediately available when the steam source is of limited generating capacity, the supply vessel 24 is preferably an accumulator in which the steam is stored, the steam inlet to the accumulator being provided with a non-return valve 25 and a condensate vessel 26 being connected to the accumulator. If the regulating process repeats itself frequently at short intervals it can happen that the supply of steam is inadequate in order to maintain a certain minimum pressure in the accumulator. If such conditions should occur it is possible to dispense temporarily with acceleration by means of the addition of steam and instead to operate the variable speed turbine at full or nearly full speed so that the compressor is able without delay to supply the maximum quantity of air. This operation takes place with a reduced efficiency but is not noticed in view of the rarity of its occurrence and its short duration.

For this emergency operation a device 27 is provided whose power piston 31 influences the basic position of the linkage of governor 18 in such a manner that turbine 5 is supplied by means of elements 14, 15, 16 and 17 with the amount of driving gas necessary to enable the turbine to attain maximum speed. During normal operation there is a pressure in accumulator 24 which exerts a force on piston 31 greater than that of spring 29 so that the regulating mechanism is always actuated in accordance with the movement of cam 12. Only when the steam pressure drops below a certain minimum value due to the quantity of steam stored in the accumulator becoming exhausted will spring 29 lift the rod from the cam 12 and adjust the speed to a higher value.

Water instead of steam can also be mixed with the driving gases. In this case the amount of fuel must immediately be increased still more because now it is necessary not only to supply the superheat for the steam but also the latent heat for the evaporation of the injected water. The air required for the combustion of the fuel is again taken from the cooling air until the compressor reaches the point where it alone can deliver the amount of driving medium corresponding to the new load. It is to be understood that the invention is not limited to the specific embodiment herein illustrated and described, and that other control mechanisms for automatically injecting water or steam into the driving gases to cool the same and to increase their volume fall within the spirit of my invention as set forth in the following claims.

I claim:

1. A combustion gas turbine plant comprising a power turbine for operation at constant speed, a variable speed turbine driving an air compressor, a combustion chamber receiving compressed air from said compressor, means for supplying fuel to said combustion chamber, means for supplying driving gases to said turbines from said combustion chamber, control means responsive to a decrease in the speed of said power turbine below a selected value to increase the fuel supply to said combustion chamber, whereby the quantity of air delivered to the combustion chamber increases as the variable speed turbine picks up speed in response to the increased fuel supply, and means responsive to a rise in the temperature of the combustion gases to a preselected value to introduce a fluid medium into the combustion gases to lower the temperature and to increase the volume thereof, said temperature responsive means including means for reducing the pressure within said combustion chamber upon increases in the supply of fuel and of air thereto.

2. A combustion gas turbine plant as recited in claim 1, wherein said means for reducing the pressure within the combustion chamber includes a by-pass pipe connection between said combustion chamber and one of said turbines, and a valve normally closing said by-pass pipe, said temperature-responsive means opening said valve substantially simultaneously with the introduction of the fluid medium into the combustion gases.

3. A combustion gas turbine plant as recited in claim 1, wherein said means for reducing the pressure within the combustion chamber includes a by-pass pipe connection between said combustion chamber and said variable speed turbine, and a valve normally closing said by-pass pipe, said temperature-responsive means opening said valve substantially simultaneously with the introduction of the fluid medium into the combustion gases.

4. In a combustion gas turbine plant, a power turbine and a variable speed turbine driving a compressor supplying compressed air to a combustion chamber, means for supplying fuel to said combustion chamber, pipes connecting said combustion chamber to said turbine to supply driving gases thereto, a supply vessel for containing a fluid medium for injection into the combustion gases, control means responsive to a decrease in the power turbine speed below a selected value to increase the fuel supply to said combustion chamber and substantially simultaneously to open a connection between said supply vessel and said pipes, and means responsive to a decrease in the pressure within said supply vessel below a selected value to adjust said variable speed turbine for operation at an increased speed, thereby to increase the air supply to said combustion chamber.

OTTO ZWEIFEL.